Dec. 31, 1957     G. L. SCHNABLE     2,818,375

METHOD OF FORMING AND ATTACHING SOLDER

Filed May 23, 1955

INVENTOR:
GEORGE L. SCHNABLE
BY Howson & Howson
ATTYS.

United States Patent Office 2,818,375
Patented Dec. 31, 1957

2,818,375
METHOD OF FORMING AND ATTACHING SOLDER

George L. Schnable, Lansdale, Pa., assignor to Philco Corporation, Philadelphia, Pa., a corporation of Pennsylvania Application May 23, 1955, Serial No. 510,164

12 Claims. (Cl. 204—15)

The present invention relates to a novel method of forming and attaching a body of solder at an end of a fine, elongated metal article; and, more particularly, the invention relates to a novel method for attaching a body of solder to an end of a fine metal strip or wire.

There are many instances, particularly in the electrical and electronic field, where it is necessary to attach an end of a fine metal wire or strip to another metal surface. Soldering would be a most convenient way of making this attachment if the required amount of solder, in proper physical form for the subsequent soldering operation, could be provided at the point at or near the tip of the wire or strip where the junction is to be made.

Various procedures for attaching a solder to the end of a wire or strip have been attempted in the past, but these have not proved completely satisfactory, particularly for commercial operation. For example, dipping the ends of the wires or strips into a molten solder results in only a relatively thin coating of solder on the end of the wire, and the thickness of the coating cannot be varied or controlled since it is limited to that amount which will wet and adhere. In assemblies comprising, for example, a plurality of fine wires of the same length, and where it is desired to apply solder to the tip of only one, or less than all the wires, dipping the assembly into molten solder would be inconvenient if not impossible. It is possible to electroplate the desired amount of solder on the tip of a wire or strip, or on one of a plurality of wires or strips, by maintaining electrical contact with the selected wire or strip. However, a long time is required, and the deposit is porous, presenting a larger surface and a lower density than is theoretically obtainable, and wherein components of the bath, such as salts, acids, organic additives, and the like, may be occluded as impurities. Moreover, the thus-plated deposit is cylindrical in shape, often resulting, on soldering, in the formation of one or more spheres of solder along the wire or strip at locations other than the point where it is desired. Furthermore, since many solders are alloys, in order to convert the electrodeposited mixture of metals to the desired alloy form, it may have to be heated to melt the metals. This presents difficulties.

It is the principal object of the present invention to provide a simple method for attaching a body of a solder to an end of a relatively fine, elongated metal article, such as a fine metal wire or strip.

Another object is to provide a method for attaching a controlled amount of solder to an end of a relatively fine, elongated metal article.

Still another object is to provide a method for attaching a non-porous, dense, smooth bead of solder in the desired amount at an end of a relatively fine, elongated metal article, such as a very fine wire or strip of metal.

A further object is to provide a method for attaching in one operation, at an end of a relatively fine, elongated metal article, a smooth bead of solder in homogeneous alloy form.

Other objects will become apparent from a consideration of the following specification and claims.

The method of the present invention comprises immersing an end of the fine, elongated metal article to which it is desired to attach the solder, as cathode, in a liquid bath comprising the solder metal ions in solution at a temperature not substantially below the melting point of the solder, providing an anode, and completing the circuit whereby the desired solder is electrodeposited, in molten form, at the immersed end of the metal member. Upon removal of the plated metal article from the bath, the solder solidifies forming a smooth, dense, homogeneous bead thereof at the end of the article.

The process of the present invention may be more readily understood from a consideration of the drawings in which.

Figure 1:
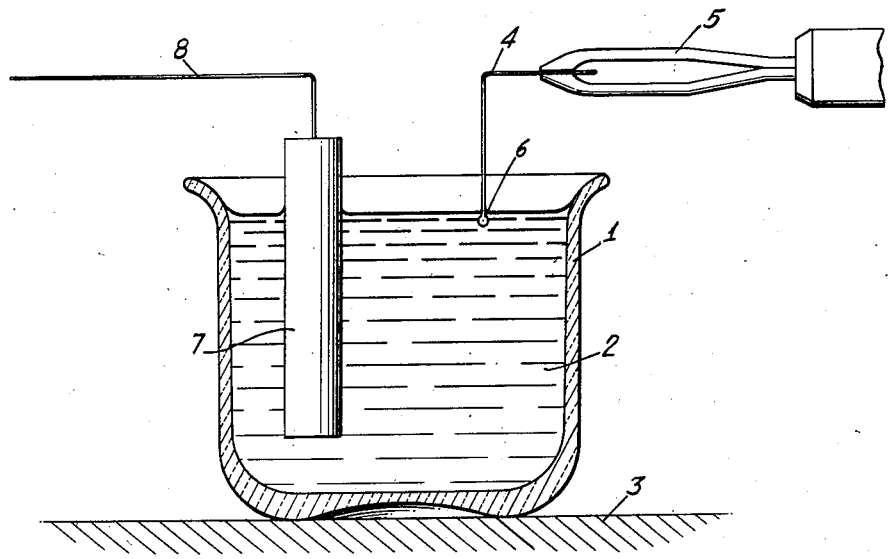
Figure 1 illustrates apparatus in operation for practicing the process.

The process of the present invention possesses many important advantages over prior attempted procedures for attaching solder to the ends of relatively fine wires and metal strips. The deposit produced is dense and non-porous, and therefore is in a form highly suitable for the subsequent soldering operation. The deposit is also virtually free of non-metallic components of the bath which are not deposited in the ionic state, such as salts, acids, organic additives, and the like. When the solder is an alloy, it is formed as such during deposition. Moreover, the deposition is very rapid since high current densities, which would ordinarily cause dendritic growths under normal electroplating operations, may be used. Since the hydrogen overvoltage on the molten metals is high, considerably better current efficiencies at high current densities are obtained. In many cases, essentially 100% current efficiency can be obtained so that the amount of metal solder deposited is directly proportional to plating current and time. Thus the amount of deposit can be readily controlled. As the molten metal plates out, surface tension causes the deposit to assume an ellipsoidal or spherical form, depending on the exact shape of the article being treated, so that in time a bead containing the desired amount of solder can be built up. The method is applicable to providing a bead of solder having the stated characteristics at the tip of one, or less than all, of a plurality of wires in an assembly comprising a plurality of wires electrically insulated from each other, such as transistor leads, by making the desired wire or wires the cathode in the procedure.

As stated, the present method is applicable for the attachment of solder to relatively fine, elongated metal articles such as wires and strips. The fineness of the wires and strips is immaterial, and the method is especially applicable for attaching a solder to the tips of "whisker" wires such as used in transistor manufacture. Such wires may have a diameter as fine as 1–2 mils. As stated, strips (including ribbons) may also be treated, and a body of solder applied to the end of the strip itself. Depending upon the particular application, the end of the wire or strip to which the solder is applied may have any one of a wide variety of configurations. For example, the strip may be bent, hooked or forked, or the wire may be flattened, bent, hooked or forked, or both flattened and bent, hooked or forked.

The nature of the metal from which the wire or strip is made is not critical in so far as the broader aspects of the present process is concerned, so long as it has a melting point sufficiently above the melting point of the solder that it is not deleteriously affected at the temperature of operation. Generally, the article to which the solder is attached will comprise copper, nickel, aluminum, steel, iron, platinum, iridium, or the like, or alloys containing one or more of these.

Likewise, the nature of the solder material itself may vary widely depending upon the particular application. As is conventional, the solder will be such as will form a bond between the two metal members sought to be joined, and will, of course, have a melting point below that of either of the two metal members. This permits a wide selection of metals and metal alloys from which the solder may be prepared. For most purposes, however, solders have a melting point below about 350° C., most solders for use in electrical and electronic equipment melting between about 120 and about 300° C. Examples of suitable solder metals and allows are tin, indium, alloys containing one or both of these metals, such as tin-lead, cadmium-indium, tin-indium, cadmium-tin, and the like. In this connection, an alloy of cadmium and indium has been found to be particularly useful as a solder metal as disclosed and claimed in copending application Serial No. 510,536, filed May 23, 1955. The ratio of indium to cadmium may vary between about 40 and about 85 parts of the former and about 15 and about 60 parts of the latter, preferably between about 60 and about 80%, of indium, with the eutectic alloy at 75 parts of indium to 25 parts of cadmium and melting at 122.5° C. being particularly suitable.

The process involves electrodepositing the solder, in molten form, on the end of the metal member. There is thus required an electroplating bath which can be maintained at a temperature at least not substantially below the melting point of the deposited metal. Since, during electrodepositing, heat is evolved at the cathode, the heat so evolved may be sufficient to maintain the temperature of the metal being deposited at or above its melting point so that it will be deposited in molten form even when the average temperature of the bath is slightly below the melting point of the solder. In most cases, however, the temperature of the bath will be maintained at least at the melting point of the solder, and preferably above it.

The bath, as stated, will be liquid at the temperature of operation, and the material or materials making up the bath may vary widely. Thus the bath may be a molten salt or molten mixture of salts serving not only as the bath but also as source of the solder metal. For example, stannous chloride may be employed to serve, in molten form, as the bath and as source of tin; bismuth trichloride may be used as bath and as source of bismuth, or indium monobromide may be used as bath and as source of indium. Combinations of metal salts may be used where an alloy is desired, or combinations of a metal salt or salts with a non-metal salt or salts, such as ammonium chloride, may be employed. In this embodiment it may be desirable to add free metal to the bath to replenish the metal ions during electrodeposition.

In another embodiment a solvent is employed which is not itself a source of metal. In this case the solvent will comprise, at the temperature of operation, a liquid having a boiling point above the temperature of operation discussed above. The material serving as this liquid solvent at the temperature of operation may be a high boiling organic compound, or mixture of compounds, in which ionic conductance occurs at the temperature of operation, or a molten salt or mixture of salts the cation of which does not plate out during the electrodepositing operation.

Examples of polar organic compounds that may be employed are the polyhydric alcohols, such as glycerol; the glycols, for instance ethylene glycol, propylene glycol; the polyethylene glycols, especially diethylene glycol; 1,2,4-butanetriol, sorbitol, and the like; glycol derivatives, such as ethylene glycol monobutyl ether, and the like; high boiling amines, such as triethanolamine, N,N,N',N'-tetrakis (2-hydroxypropyl) ethylene diamine, and the like; amides such as acetamide; phenol; phthalic anhydride; benzoic acid; and the like. The organic material may be solid at ordinary temperatures so long as it is liquid at the temperature of operation, as is the case with many of those materials mentioned above. A particularly advantageous bath for depositing a cadmium-indium alloy solder in molten form is one containing indium trichloride, cadmium chloride and ammonium chloride dissolved in a polar organic compound, the bath also containing a polybasic acid forming a soluble complex with indium in solution such as ethylene diamine tetraacetic acid, and the proportions of the metal salts providing controlled deposition of cadmium-indium eutectic. This bath and its use are disclosed and claimed in copending application Serial No. 510,504, filed May 23, 1955.

With respect to fused salt baths, salts and mixtures thereof which form molten liquids at temperatures ranging from about 120 to about 350° are well known. From these may be selected a wide variety of salts and mixtures of salts which will serve as the liquid solvent at the temperature of operation. If a metal salt or salts is used as solvent only, the metal cation thereof should be above the solder metal or metals in the electromotive series (less noble) so that it will not be plated out. Examples of salts that are readily applicable are zinc chloride, mixtures of zinc chloride and ammonium chloride, mixtures of lithium chloride and potassium chloride, and the like. A particularly advantageous salt bath for metals melting below about 250° C. is a mixture of zinc chloride and ammonium chloride containing between about 6% and about 30%, by weight, of ammonium chloride, the balance being zinc chloride. In this connection, a particularly advantageous mixture is one having a ratio of about three parts of zinc chloride to about one part of ammonium chloride forming an eutectic mixture melting at about 180° C. The use of such mixture in electroplating is the subject of copending application Serial No. 544,375, filed November 1, 1955, as a continuation-in-part of application Serial No. 510,537, filed May 23, 1955.

In either the organic liquid bath or the fused salt baths, ammonium chloride is often a desirable constituent since it results in a brighter deposit, particularly when the solder comprises tin, and adds to the conductance of the bath. When certain metal articles are being plated, it may be desirable to incorporate other additives in the bath. For example, with aluminum it is desirable to etch slightly immediately before the solder begins to deposit. For this purpose a fluoride, such as amonium bifluoride, may be used.

Regardless of the materials from which the bath is prepared, the metal which it is desired to deposit at the cathode will exist in the bath, just prior to deposition, in solution in the form of ions. These may be provided by having dissolved in the bath a salt or salts, the cation of which corresponds to the solder metal, or by adding to the bath free metal. In the latter case the free metal may serve as anode or may be added as such, an inert anode being used, in either event the metal dissolving in the bath during operation to form metal ions which ultimately deposit.

When metal salt is added to the bath, any salt of the desired metal or metals soluble in the vehicle may be employed. In this connection, the halides, particularly the chlorides, of the solder metals have been found to be particularly useful, such as indium mono- or di-chloride, stannous chloride, cadmium chloride, and the like, and the corresponding bromides and iodides. Sulphates and nitrates may also be employed, such as lead nitrate. The solder metal salt or salts may also be formed in situ in the bath. For example, the addition of solder metal itself to a fused salt bath will result in the dissolution of the metal forming metal salt in solution.

With the bath at operating temperature, which be between about 120 and about 350° C., an anode is provided and the relatively fine, elongated metal article, the tip of which is to be plated, will serve as cathode. A wide variety of materials may be employed as anode, such as carbon, tungsten, platinum, and the like. Solder metal itself may serve as the anode to which is contacted the anode lead wire. For example, where indium is to be plated out at the cathode, excess indium metal may be added to the bath to provide not only the indium salt in solution as discussed above but also a molten globule thereof in the bottom of the bath. This indium metal globule, upon contact of the anode lead wire therewith, serves as anode and renders the bath self-replenishing.

In practicing the process, with the bath at operating temperature and the anode being provided, the end of the wire or strip is immersed in the bath to the depth dictated by the size of deposit desired. The circuit is completed. Molten solder metal then deposits on the submerged portion of the strip or wire. At the deposit of molten solder metal builds up, due to surface tension of the molten metal, it assumes a shape which is ellipsoidal or spherical in horizontal cross-section, depending upon whether a wire or metal strip is being treated and upon the particular shape of the submerged portion. Gravity causes the molten bead to concentrate at the tip of the immersed wire or strip. When the desired amount of metal has been deposited, which can be determined visually, the plated wire or strip is removed from the bath. The molten metal rapidly solidifies to form a smooth-surfaced, dense, non-porous bead of the solder at the tip of the wire or strip.

The above procedure is illustrated in Figure 1, where 1 is a vessel, which may be glass, ceramic, or the like, containing electrodepositing bath 2. Vessel 1 rests on surface 3 which is preferably heated to maintain the electrolyte bath at the desired temperature of operation. 4 is a fine wire or strip, the tip of which is immersed in the bath. Strip or wire 4 is held, as by tweezer structure 5 connected to a suitable source of electric current. 6 is the deposit of solder metal forming at the tip of wire or strip 4. 7 represents the anode connected to a source of current by means of lead wire 8.

Figure 2:
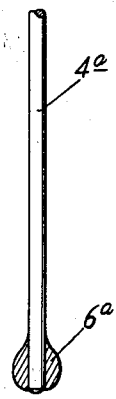
Figure 2 is an enlarged view of the end of a wire or metal strip containing the deposit of solder thereon.

Referring to Figure 2, this shows a greatly enlarged cross-section of the strip or wire 4a, the tip of which has been provided with the bead of solder 6a.

In soldering with the thus treated wire or strip, the end of the wire or strip is contacted with the metal surface to which the wire or strip is to be bonded and heat is applied to melt the solder. The molten solder then flows and wets the other metal surface, thereby bonding, after solidifying, the wire or strip to the other metal surface. One method that may be used in soldering is the immersion soldering procedure generally disclosed and claimed in copending application Serial No. 514,812, filed June 13, 1955.

The present method will be more readily understood from a consideration of the following specific examples which are given for the purpose of illustration only and are not intended to limit the scope of the invention in any way.

Example I

Thirty grams of zinc chloride are mixed with ten grams of ammonium chloride, and the mixture heated to 320° C., forming a clear melt. The melt is then cooled to 220° C. Ten grams of indium metal are then added to the bath. Half of the indium is permitted to dissolve forming indium monochloride in solution in the bath. The excess indium metal, in molten form, remains at the bottom of the bath. An anode lead wire is inserted into the bath and contacted with the globule of molten indium metal.

The tip of a nickel wire 5 mils in diameter is immersed in this bath, being held by a tweezer arrangement connected to a source of electric current. The wire serves as cathode, and the circuit is completed. A direct current of about 100 milliamperes at 4½ volts is employed. Immediately molten indium begins to plate out at the tip of the wire. In a few seconds a bead of molten indium is formed.

The wire with the molten bead attached is then removed from the bath following which the solder solidifies to form a smooth dense bead of indium at the tip of the wire.

Example II

In this example a bath is prepared by dissolving two grams of stannous chloride in 100 milliliters of glycerol and heating to 240° C. A carbon anode is immersed in the bath. The tip of a copper wire is immersed in the bath to serve as cathode, the wire being connected to a source of direct current. The circuit between the anode and the copper wire is completed. The E. M. F. is 6 volts. In a short time a globular deposit of tin forms at the tip of the copper wire.

In this example a few grams of ammonium chloride may be added to the bath to make the deposit brighter and to add to the conductance of the electrolyte.

Example III

A bath is prepared by adding 4.1 grams of anhydrous cadmium chloride and 14.5 grams of anhydrous indium trichloride to 100 grams of glycerol heated to 140° C. 35 grams of ethylene diamine tetraacetic acid are then added and dissolved, following which 10 grams of ammonium chloride are added and dissolved. The resulting bath is maintained at 140° C. for operation.

A carbon rod is immersed in the bath as anode.

The tip of a nickel wire 2 mils in diameter is immersed vertically to a distance of about 10 to 15 mils in the bath. The circuit is completed, an E. M. F. of about 15 volts being employed. After about 10 seconds a one microgram deposit of cadmium-indium alloy of approximately eutectic composition (25% cadmium and 75% indium, M. P. 122.5° C.) is formed at the tip. The bead is about 4 mils in diameter and about 10 mils in length.

Example IV

By following the procedure of Example III but using indium trichloride alone in ethylene glycol at 180° C., a molten bead of indium is deposited on the end of a nickel wire.

Example V

Two grams of stannous chloride are mixed with 20 grams of N,N,N',N'-tetrakis (2-hydroxypropyl) ethylene diamine and the mixture heated to 250° C. A carbon rod is employed as anode and the end of a copper wire is immersed in the bath as cathode. Within a short time a bead of tin forms at the immersed tip of the wire.

Example VI

Five grams of phthalic anhydride are mixed with 0.5 gram of indium trichloride and the mixture heated to 200° C. to form a clear solution. A carbon rod is immersed in the bath as anode, and the end of a copper wire is immersed as cathode. The circuit is completed, an E. M. F. of 90 volts being employed. Within a short time a bead of molten indium forms at the tip of the copper wire. Upon removal of the wire, the indium solidifies to a smooth, dense bead.

Example VII

Two grams of indium trichloride and 4 grams of ammonium chloride are mixed with 20 grams of 1,2,4-butanetriol. In the solution, heated to 180° C., a carbon rod is immersed as anode and the tip of a #26 copper wire as cathode. Direct current at 6 volts is employed. Within a short time a bead of indium forms at the tip of the copper wire.

Example VIII

Two grams of indium trichloride are mixed with 20 grams of N,N,N',N'-tetrakis (2-hydroxypropyl) ethylene diamine. In the solution, heated to 230° C., are immersed a carbon rod as anode and the tip of a #26 copper wire as cathode. A direct current at 6 volts is employed. Within a short time a bead of indium forms on the tip of the copper wire.

Example IX

Two tenths of a gram of indium trichloride and 0.2 gram of ammonium chloride are mixed with 1 gram of benzoic acid. In the solution, at 200° C., are immersed a carbon rod as anode and the tip of a #26 copper wire as cathode. A direct current at 90 volts is employed. A bead of indium forms on the tip of the copper wire.

Example X

One gram of indium trichloride is mixed with 10 grams of d-sorbitol. In the solution, at 160° C., are immersed a carbon rod as anode and the tip of a #26 copper wire as cathode. A direct current at 24 volts is employed. A bead of indium forms on the tip of the copper wire.

Example XI

One gram of indium trichloride is mixed with 10 grams of ethylene glycol monobutyl ether. In the solution, at 165° C., are immersed a carbon rod as anode and the tip of a #26 copper wire as cathode. A direct current at 24 volts is employed. A bead of indium forms on the tip of the copper wire.

Example XII

One gram of indium trichloride and 1 gram of ammonium chloride are mixed with 10 grams of phenol. In the solution, at 165° C., are immersed a carbon rod as anode and the tip of a #26 copper wire as cathode. A direct current of 24 volts is employed. A bead of indium forms on the tip of the copper wire.

Example XIII

One gram of indium trichloride is mixed with 10 grams of acetamide. In the solution, at 170° C., are immersed a carbon rod as anode and the tip of a #26 copper wire as cathode. A direct current at 24 volts is employed. A bead of indium forms on the tip of the copper wire.

Example XIV

Six grams of potassium chloride are mixed with 5 grams of lithium chloride, and the mixture heated to 650° C. to form a clear melt. The melt is then cooled to 400° C., and indium trichloride is added to the point of saturation. A carbon rod is immersed as anode and the tip of a #24 copper wire is immersed as cathode. The circuit is completed, an E. M. F. of 6 volts being employed. A bead of indium forms at the tip of the copper wire.

Example XV

Four grams of zinc chloride (anhydrous), 6 grams of indium monochloride and 1 gram of cadmium chloride are mixed and heated to a clear melt at 230° C.

In the resulting solution at 230° C. are immersed a carbon rod as anode and the tip of a nickel wire as cathode, and the circuit is completed at 6 volts. A nitrogen atmosphere is employed to present air oxidation of the indium. A bead of cadmium-indium eutectic forms at the tip of the wire.

Example XVI

In this example molten anhydrous stannous chloride at 290° C. is the entire bath. A pool of molten tin is maintained at the bottom of the bath as anode being connected to a suitable source of current. The flattened and bent tip of a copper wire is immersed in the bath as cathode.

Operating voltage is 1.5 volts, and a bead of molten tin deposits at the cathode.

Considerable modification is possible in the selection of the various ingredients in preparing the bath, in the metal articles treated and in the nature of the solder deposited, without departing from the scope of the invention.

I claim:

1. The method of forming and attaching a body of solder metal at an end of a fine, elongated metal article which comprises immersing only the end of said article, as cathode, in a non-aqueous liquid bath comprising the solder metal in ionic form in solution, said liquid bath having a boiling point above the melting point of the solder metal, providing an anode, and completing the circuit, said bath being at a temperature at which the solder electrodeposited at the immersed end of the metal article is in molten form.

2. The method of claim 1 wherein said bath comprises a solution of salt of the solder metal in a liquid high-boiling polar organic compound.

3. The method of claim 2 wherein said organic compound is a polyhydric alcohol having a boiling point above the melting point of the solder metal.

4. The method of claim 1 wherein said bath comprises a solution of salt of the solder metal in molten inorganic salt.

5. The method of claim 1 wherein said bath comprises molten salt of solder metal.

6. The method of claim 1 wherein said anode comprises solder metal.

7. The method of forming and attaching a body of solder metal at an end of a fine, elongated metal article which comprises immersing only the end of said article, as cathode, in a non-aqueous liquid bath comprising the solder metal in ionic form in solution, said bath having a boiling point above the melting point of the solder metal and being at a temperature of at least the melting point of the solder metal, providing an anode, and completing the circuit, whereby the desired solder is electrodeposited in molten form at the immersed end of the metal article.

8. The method of claim 7 wherein said bath comprises a solution of salt of the solder metal in a liquid high boiling polar organic compound.

9. The method of claim 8 wherein said organic compound is a polyhydric alcohol having a boiling point above the melting point of the solder metal.

10. The method of claim 7 wherein said bath comprises a solution of salt of the solder metal in molten inorganic salt.

11. The method of claim 7 wherein said bath comprises molten salt of solder metal.

12. The method of claim 7 wherein said anode comprises solder metal.

References Cited in the file of this patent

UNITED STATES PATENTS

| | | |
|---|---|---|
| 1,004,673 | Monnot | Oct. 3, 1911 |
| 1,732,317 | Thoma | Oct. 22, 1929 |